United States Patent
Sulser et al.

(10) Patent No.: US 9,096,470 B2
(45) Date of Patent: Aug. 4, 2015

(54) POLYMER OF MALEIC ACID, ALLYL ETHER AND (METH)ACRYLIC ACID COMPOUNDS, AND PREPARATION AND USE THEREOF

(75) Inventors: Ueli Sulser, Unterengstringen (CH); Lukas Frunz, Zürich (CH); Joerg Zimmermann, Winterthur (CH)

(73) Assignee: SIKA TECHNOLOGY AG, Zurich (CH)

( * ) Notice: Subject to any disclaimer, the term of this patent is extended or adjusted under 35 U.S.C. 154(b) by 0 days.

(21) Appl. No.: 14/113,496

(22) PCT Filed: May 7, 2012

(86) PCT No.: PCT/EP2012/058396
§ 371 (c)(1),
(2), (4) Date: Oct. 23, 2013

(87) PCT Pub. No.: WO2012/152766
PCT Pub. Date: Nov. 15, 2012

(65) Prior Publication Data
US 2014/0051801 A1    Feb. 20, 2014

(30) Foreign Application Priority Data

May 10, 2011    (EP) .................................... 11165546

(51) Int. Cl.
*C04B 24/32* (2006.01)
*C04B 24/26* (2006.01)
*C04B 28/02* (2006.01)
*C08F 216/14* (2006.01)
*C08F 220/06* (2006.01)
*C08F 222/06* (2006.01)
*C04B 103/30* (2006.01)

(52) U.S. Cl.
CPC ............... *C04B 24/32* (2013.01); *C04B 24/267* (2013.01); *C04B 24/2647* (2013.01); *C04B 28/02* (2013.01); *C08F 216/1416* (2013.01); *C08F 220/06* (2013.01); *C08F 222/06* (2013.01); *C04B 2103/308* (2013.01)

(58) Field of Classification Search
CPC ................................ C04B 24/32; C04B 28/02
USPC .............. 524/5, 8; 526/140, 227, 318.42, 320
See application file for complete search history.

(56) References Cited

U.S. PATENT DOCUMENTS

| 6,388,038 | B1 | 5/2002 | Hirata et al. |
| 2009/0163622 | A1 | 6/2009 | Albrecht et al. |
| 2011/0166261 | A1* | 7/2011 | Lorenz et al. ..................... 524/5 |
| 2012/0142876 | A1* | 6/2012 | Kawakami et al. ........... 526/240 |

FOREIGN PATENT DOCUMENTS

| DE | 10 2005 061 153 A1 | 6/2007 |
| WO | WO 2010/029117 A2 | 3/2010 |

OTHER PUBLICATIONS

English Abstract of CN 101845121 A, China, Sep. 2010.*
"Initiator für radikalische Polymerisationen" oder "Radikalinitiator" (Initiator for radical polymerization or "radical initiator"); CD Römpp Lexikon; 1995; 9th edition; version 1.0; Georg Thieme Publishers; Stuttgart.
"Hydraulisch abbindende Bindemittel" ("Hydraulically setting binders"); CD Römpp Lexikon; 1995; 9th Edition; Version 1.0; Georg Thieme Publishers; Stuttgart.
Jun. 6, 2012 International Search Report issued in International Patent Application No. PCT/EP2012/058396 (with translation).

* cited by examiner

*Primary Examiner* — Tae H Yoon
(74) *Attorney, Agent, or Firm* — Oliff PLC

(57) ABSTRACT

The invention relates to comb polymers of maleic acid or derivatives thereof, allyl ethers and (meth)acrylic acid or derivatives thereof, and to the preparation thereof by free radical polymerization at a reaction temperature of 10° C. to 50° C. The invention further relates to the use of such comb polymers for improving the processability of hydraulically setting compositions.

21 Claims, No Drawings

POLYMER OF MALEIC ACID, ALLYL ETHER AND (METH)ACRYLIC ACID COMPOUNDS, AND PREPARATION AND USE THEREOF

TECHNICAL AREA

The present invention relates to additives for hydraulically setting systems, especially dispersants for concrete compositions.

PRIOR ART

Polymers of maleic acid or derivatives thereof with allyl ethers or vinyl ethers are used as plasticizers in concrete technology because of their water-reducing properties. Upon addition of such polymers to hydraulically setting compositions such as cements, the water fraction can be reduced, which is advantageous for the stability of the concrete. These polymers have a comb polymer structure. In the prior art essentially temperatures in excess of 60° C. are used for producing comb polymers of this class, for example in U.S. Pat. No. 6,388,038 B1.

A particular problem with known plasticizers based on comb polymers consists of the fact that the long-term processability decreases rapidly over time, so that after only a short time the hydraulically setting compositions are only poorly processable.

PRESENTATION OF THE INVENTION

Therefore the goal of the present invention is to supply polymers made from maleic acid or its derivatives and allyl ether which do not have the above-described drawbacks. New plasticizers based on maleic acid or its derivatives and allyl ethers for use in hydraulically setting compositions which have special, advantageous properties are to be supplied. The polymers are said to display an improved plasticizing effect in hydraulically setting compositions. In particular the invention is based on the problem of supplying polymers that permit good long-term processability for hydraulically setting compositions.

Surprisingly it has now been found that polymers according to claim 1 and polymers produced using a method according to claim 6 solve this problem. Such polymers result in both improvement of the long-term processability and improvement of the water reduction in hydraulically setting compositions.

Additional aspects of the invention are the subjects of further independent claims. Particularly preferred embodiments of the invention are subjects of the dependent claims.

METHODS OF EXECUTING THE INVENTION

The present invention relates to a polymer P comprising:
a. m mol-% of at least one structural unit A of Formula (I);

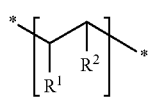

b. n mol-% of at least one structural unit B of Formula (II);

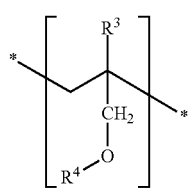

c. o mol-% of at least one structural unit C of Formula (III);

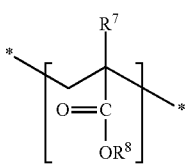

and optionally
d. p mol-% of at least one additional structural unit D;
wherein $R^1$ and $R^2$ here each independently represents COON or $COOR^4$,
$R^3$ represents H or $CH_3$, especially H,
$R^4$ represents

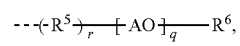

$R^5$ represents an alkylene group with 1 to 6 C atoms,
$R^6$ represents H, an alkyl group, preferably with 1 to 20 C atoms, or an alkylaryl group, preferably with 7 to 20 C atoms,
$R^7$ represents H or $CH_3$, especially H,
$R^8$ represents M, an alkyl group with 1 to 6 C atoms, a hydroxyalkyl group with 1 to 6 C atoms or

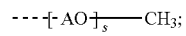

wherein the substituent A independently represents a C2- to C4-alkylene group, the subscript q represents a value from 2 to 300, especially from 2 to 50, the subscript r represents a value of 0 to 1 and the subscript s represents a value from 1 to 5;
wherein M=cation, preferably $H^+$, alkali metal ion, alkaline earth metal ion, bivalent or trivalent ion, $NH_4^+$ or an organic ammonium, particularly preferably $H^+$, $Na^+$, $Ca^{++}/2$, $Mg^{++}/2$, $NH_4^+$ or an organic ammonium;
wherein m, n, o, p independently represent numbers, wherein the total of m+n+o+p=100, and m>0, n>0, o>0 and p≥0; and
wherein
m=10-80, preferably 30-60, particularly preferably 40-55, most preferably 40-55;
n=10-50, preferably 20-40, particularly preferably 30-40,
o=10-50, preferably 15-30, particularly preferably 17.5-30, most preferably 20-25,
p=0-20, preferably 0-10, particularly preferably 0-5.

The term "polymer" in the present document on one hand represents a group of chemically uniform macromolecules, differing in terms of their degree of polymerization, molecular weight and chain length, which are produced by a polyreaction (polymerization). On the other hand the term also covers derivatives of such a group of macromolecules from polyreactions, thus compounds that were obtained by reactions, for example such as additions or substitutions, of functional groups to form predetermined macromolecules and which may be chemically uniform or chemically non-uniform.

In the present document, the term "comb polymer" designates a comb polymer consisting of a linear polymer chain (=main chain) to which side chains are bonded via ester or ether groups. The side chains here form the "teeth" of a "comb" in terms of their appearance.

It is clear to a person skilled in the art that COO$^-$M on one hand is a carboxylate to which the ion M is bound, and on the other hand in the case of polyvalent ions M, the charge must be balanced by counter-ions.

The bold-face notations such as P, A, A', B, B', C, C', D, D' and the like in the present document are provided only for better understanding and identification by the reader.

The structural unit C is typically a unit formed by polymerization of a (meth)acrylic acid or derivative thereof, especially a salt, anhydride or ester thereof. "(Meth)acrylic acid" will be used throughout the present document to designate both acrylic acid and methacrylic acid. Examples of such esters are methyl(meth)acrylate, ethyl(meth)acrylate, propyl (meth)acrylate, butyl(meth)acrylate, pentyl(meth)acrylate, 2-hydroxyethyl(meth)acrylate, hydroxypropyl(meth)acrylate, 4-hydroxybutyl(meth)acrylate, 5-hydroxypentyl(meth) acrylate, 2-methoxyethyl(meth)acrylate, 2-(2-methoxyethoxy)ethyl-(meth)acrylate, 2-(2-(2-methoxyethoxy) ethoxy)ethyl-(meth)acrylate, 3-methoxypropyl-(meth) acrylate, 3-(3-methoxypropoxy)propyl-(meth)acrylate, and 3-(3-(3-methoxypropoxy)propoxy)propyl-(meth)acrylate.

Structural unit D is typically one of the units formed by polymerization from ethylenically unsaturated carboxylic acids or derivatives thereof, especially their salts, anhydrides, esters or amides.

Examples of suitable structural units D are units produced by polymerization from mesaconic acid, citraconic acid, glutaconic acid, fumaric acid, maleamic acid, itaconic acid, vinylbenzoic acid, crotonic acid, or anhydrides of the above-mentioned acids or derivatives thereof, especially their salts, anhydrides, esters or amides. Preferred are monocarboxylic acids or derivatives thereof, especially their salts, anhydrides, esters or amides.

It may further be advantageous if the polymer P contains less than 5 mol-% of structural unit D, in particular contains no structural unit D.

The polymer P preferably has a mean molecular weight $M_n$ of 2000-200,000 g/mol, preferably 5000-70,000 g/mol, especially preferably 15,000-50,000 g/mol.

It is furthermore particularly advantageous if in the polymer P, m=40-50, n=30-40, o=17.5-30, especially o=20-25 and p=0-5, especially p=0.

Preferably $R^8$ is M in the polymer P. This is advantageous in that especially good results are achieved for increasing the long-term processability of hydraulically setting compositions.

It may furthermore be advantageous if $R^8$ represents an alkyl group with 1 to 6 C atoms, a hydroxyalkyl group with 1 to 6 C atoms or

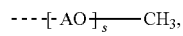

especially a hydroxyalkyl group with 1 to 6 C atoms. This is advantageous in that after it is added to hydraulically setting compositions, the slump increases over a certain period of time. In this way, for example, the plasticizing effect can be conveniently adjusted in combination with other plasticizers. In this way, for example, constant processability over time can be achieved in combination with plasticizers which lead to a very high slump immediately after addition but in which the slump drops rapidly over time.

In a preferred embodiment the polymer P comprises:
40-50 mol-% of the structural unit A of Formula (I);
30-40 mol-% of structural unit B of Formula (II);
20-25 mol-% of structural unit C;
in each case based on the total molecular weight of the structural units of A, B and C in the polymer P.

In a particularly preferred embodiment the polymer P consists to the extent of more than 95 wt %, preferably more than 98 wt %, of the previously-mentioned structural units of A, B and C with the mol-% ratios mentioned in the preceding as preferred. Thus the polymer P in addition to the structural units of A, B and C may contain additional structural units that originate, for example, from molecular weight regulators.

In a further preferred embodiment in the polymer P,
$R^1$ and $R^2$ each represent COO$^-$M;
$R^3$ represents H;
$R^4$ represents

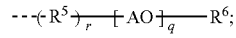

$R^5$ represents an alkylene group with 1 to 6 C atoms;
$R^6$ represents H, an alkyl group, preferably with 1 to 20 C atoms,
  in particular $R^6$ represents $CH_3$,
$R^7$ represents H or $CH_3$, especially H,
$R^8$ represents M;
the substituents A independently represent a C2- to C4-alkylene group, the subscript q represents a value of 2 to 300, especially of 2 to 50;
the subscript r represents a value of 0 to 1, especially 0;
M=cation, preferably H$^+$, alkali metal ion, alkaline earth metal ion, bivalent or trivalent metal ion, $NH_4^+$ or an organic ammonium, particularly preferably H$^+$, Na$^+$, Ca$^{++}$/2, Mg$^{++}$/2, $NH_4^+$ or an organic ammonium, most preferably H$^+$;
m=40-50
n=30-40
o=20-25;
p=0.
In a further preferred embodiment, in the polymer
P
$R^1$ and $R^2$ each represent COO$^-$M;
$R^3$ represents H;
$R^4$ represents

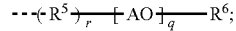

$R^5$ represents an alkylene group with 1 to 6 C atoms;
$R^6$ represents H, an alkyl group preferably one with 1 to 20 C atoms, in particular $R^6$ represents $CH_3$, $R^7$ represents H,
$R^8$ represents a hydroxyalkyl group with 1 to 6 C atoms;
the substituent A independently represents a C2- to C4-alkylene group, the subscript q represents a value of 2 to 300, especially from 2 to 50;
The subscript r represents a value of 0 to 1, especially 0;
M=cation, preferably $H^+$, alkali metal ion, alkaline earth metal ion, bivalent or trivalent metal ion, $NH_4^+$ or an organic ammonium, especially preferably $H^+$, $Na^+$, $Ca^{++}/2$, $Mg^{++}/2$, $NH_4^+$ or an organic ammonium, most preferably $H^+$;
m=40-50
n=30-40
o=20-25;
p=0.

In an additional aspect the present invention relates to a method for producing a polymer P as was described in the preceding.

In a preferred embodiment the method for producing a polymer P represents a method for producing a polymer P comprising the step of free radical polymerization of:
i) m' mol-% of at least one compound A', which is a maleic anhydride or a compound of Formula (IV);

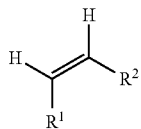

(IV)

ii) n' mol-% of at least one compound B' of Formula (V);

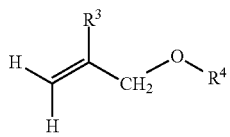

(V)

iii) o' mol-% of at least one compound C' of Formula (VI);

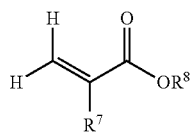

(VI)

and optionally
iv) p' mol-% of at least one additional compound D';
wherein $R^1$ and $R^2$ each independently represents $COO^-M$ or $COOR^4$, $R^3$ represents H or $CH_3$, especially H,
$R^4$ represents

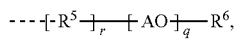

$R^5$ represents an alkylene group with 1 to 6 C atoms,
$R^6$ represents H, an alkyl group, preferably with 1 to 20 C atoms, an alkylaryl group, preferably with 7 to 20 C atoms, $R^7$ represents H or $CH_3$, especially H,
$R^8$ represents M, an alkyl group with 1 to 6 C atoms, a hydroxyalkyl group with 1 to 6 C atoms or

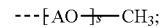

wherein the substituent A independently represents a C2- to C4-alkylene group, the subscript q represents a value from 2 to 300, especially from 2 to 50, the subscript r represents a value from 0 to 1 and the subscript represents a value from 1 to 5;
wherein M=cation, preferably $H^+$, alkali metal ion, alkaline earth metal ion, bivalent or trivalent metal ion, $NH_4^+$ or an organic ammonium, especially preferably $H^+$, $Na^+$, $Ca^{++}/2$, $Mg^{++}/2$, $NH_4^+$ or an organic ammonium;
wherein m', n', o', p' independently represent numbers, wherein the sum of m'+n'+o'+p'=100, and m'>0, n'>0, o'>0 and p'≥0; and
wherein
m'=10-80, preferably 30-60, particularly preferably 40-55, most preferably 40-55,
n'=10-50, preferably 20-40, particularly preferably 30-40,
o'=10-50, preferably 15-30, particularly preferably 17.5-30, most preferably 20-25,
p'=0-20, preferably 0-10, particularly preferably 0-5,
in the presence of an initiator for free radical polymerization at a reaction temperature of 10° C. to 50° C., preferably 15° C. to 35° C.

The term "initiator for free radical polymerization" or "free radical initiator" in the present document is defined as a compound as described as an initiator in CD Rompp Chemie Lexikon, 9th edition, version 1.0, Georg Thieme Verlag, Stuttgart 1995, which is suitable for free radical polymerization.

The compounds C' are compounds that lead by polymerization to structural units mentioned as preferred structural units C in the preceding.

It may also be advantageous if the method further contains iv) p' mol-% of at least one additional compound D'.

The compounds D' preferably represent compounds that lead by polymerization to structural units such as those mentioned as preferred structural units D in the preceding.

However, it may also be advantageous if less than 5 mol-% of an additional compound D', especially no compound D' at all, is used.

Preferably the fractions used are m'=40-50 mol-%, n'=30-40 mol-%, o'=17.5-30 mol-%, especially o'=20-25 mol-%, and p'=0 to 5 mol-%, especially p'=0 mol-%.

In a preferred embodiment the following quantities of the compounds A', B' and C' are used:
40-50 mol-% of the compound A' of Formula (IV);
30-40 mol=% of the compound B' of Formula (V)'
20-25 mol-% of the compound C' of Formula (VI);
in each case based on the total molar quantity of the compounds A', B' and C' used in the manufacturing.

In a further preferred embodiment, the following are used in the method:
$R^1$ and $R^2$ each represent $COO^-M$;
$R^3$ represents H;
$R^4$ represents

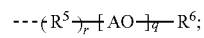

$R^5$ represents an alkylene group with 1 to 6 C atoms;
$R^6$ represents H, an alkyl group, preferably with 1 to 20 C atoms, especially $R^6$ represents $CH_3$;

$R^7$ represents H or $CH_3$, especially H,
$R^8$ represents M;
the substituent A independently represents a C2- to C4-alkylene group, the subscript q represents a value of 2 to 300, especially 2 to 50;
the subscript r represents a value from 0 to 1, especially 0;
M=cation, preferably $H^+$, alkali metal ion, alkaline earth metal ion, bivalent or trivalent metal ion, $NH_4^+$ or an organic ammonium, especially preferably $H^+$, $Na^+$, $Ca^{++}/2$, $Mg^{++}/2$, $NH_4^+$ or an organic ammonium, most preferably $H^+$;
m'=40-50
n'=30-40
o'=20-25;
p'=0.
In an additional preferred embodiment in the method:
$R^1$ and $R^2$ each represent $COO^-M$;
$R^3$ represents H;
$R^4$ represents

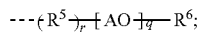

$R^5$ represents an alkylene group with 1 to 6 C atoms;
$R^6$ represents H, an alkyl group, preferably with 1 to 20 C atoms, in particular $R^6$ represents $CH_3$;
$R^7$ represents H,
$R^8$ represents a hydroxyalkyl group with 1 to 6 C atoms;
The substituent A independently represents a C2- to C4 alkylene group, the subscript q a value from 2 to 300, especially from 2 to 50;
The subscript r represents a value of 0 to 1, especially 0;
M=cation, preferably $H^+$, alkali metal ion, alkaline earth metal ion, bivalent or trivalent metal ion, $NH_4^+$ or an organic ammonium, especially preferably $H^+$, $Na^+$, $Ca^{++}/2$, $Mg^{++}/2$, $NH_4^+$ or an organic ammonium, most preferably represents Ht;
m'=40-50
n'=30-40
o'=20-25;
p'=0.
Preferably the polymer P produced according to the method of the invention has a mean molecular weight $M_n$ as was described as preferred in the preceding.

The method is performed in the presence of an initiator for free radical polymerization at a reaction temperature of 10° C. to 50° C., preferably 15° C. to 35° C. Such a reaction temperature is advantageous, among other things, in that during it no oxidative damage to the polymers formed takes place, which would negatively affect the improvement of the long-term processability of hydraulically setting compositions that can be achieved with the aid of the polymers.

Preferably the initiator for free radical polymerization contains a redox system-based initiator or a UV-based initiator. This is advantageous in that such systems efficiently contribute to the formation of free radicals at temperatures of 10° C. to 50° C., preferably 15° C. to 35° C.

Preferably the initiator for free radical polymerization is a redox system-based initiator. In particular the redox system-based initiator contains a reducing agent and a free radical forming agent wherein the reducing agent is selected from the group consisting of sodium hydroxymethane sulfinate (Rongalit), alkali metal sulfites, metabisulfites, ascorbic acid and keto-enols, and the free radical-forming agent is preferably a peroxy compound, for example hydrogen peroxide or sodium peroxide.

The initiator is preferably used in a proportion of 0.05 to 20 wt %, preferably 0.01 to 10 wt %, particularly preferably in a proportion of 0.1 to 2 wt %, based on the total weight of the sum of the compounds A', B', C' and optionally D'.

If the reaction takes place in an aqueous solvent, especially in water, alternate initiators which are readily soluble in water are preferably used.

The initiator can be added to the reaction vessel in various ways during the free radical polymerization. It can all be placed in the reaction vessel or during the polymerization reaction, continuously or stepwise, as it is consumed. Preferably the initiator is added continuously to the polymerization mixture during the course of the free radical polymerization.

The free radical polymerization is preferably performed at a pH of 2 to 4. This is advantageous since thereby hydrolytic cleavage of the compound B' is largely prevented.

It is also advantageous if the free radical polymerization is carried out in emulsion, in bulk or in solution, preferably in solution, particularly preferably in aqueous solution, most preferably in water. Aqueous solutions are advantageous for later use to extend the processability of hydraulically setting compositions if they are to be used as liquid products.

Furthermore it may be advantageous to perform the polymerization reaction in such a way that the compound C' is introduced continuously to the reaction over the duration of the polymerization reaction.

The polymer P produced on the basis of the above-described manufacturing method based on free radical polymerization at a reaction temperature of 10° C. to 50° C. has the advantage that because of uniform incorporation of the compound A', compound B', compound C' and optionally compound D', comb polymers with their different and advantageous structures and properties can be obtained, in contrast to comb polymers produced with manufacturing methods based on free radical polymerization at a reaction temperature in excess of 60° C. Surprisingly it was found that particularly advantageous properties are achieved with the use of the polymer P produced by the method of the invention, wherein in particular the processability of hydraulically setting compositions such as cement compositions is improved immediately after addition and over long time periods. The different properties are probably obtained by different distributions of side chains in the polymer P.

In the present document, the term "hydraulically setting binders" defines compounds as described in CD Rompp Chemie Lexikon, 9th edition, version 1.0, Georg Thieme Verlag, Stuttgart 1995, which set in the presence of water, even under exclusion of oxygen, for example underwater.

The term "hydraulically setting composition" is applies to compositions that contain hydraulically setting binders. Suitable compositions and binders are known to the person skilled in the art in the area of construction chemistry. In a preferred embodiment of the invention the hydraulically setting binder is selected from the group consisting of cement and slaked lime.

The usual cements are, for example, Portland cement or refractory cements and their respective mixtures with the usual additives. Cement is particularly preferred as the hydraulically setting binder.

The hydraulically setting compositions can contain the usual additives, such as fly ash, silica fume, slag, slag sand and limestone filler. Also possible are additives such as sand, gravel, rock, quartz flour, chalk, and as additives, customary components such as plasticizers, for example lignosulfonates, sulfonated naphthalene-formaldehyde condensates, sulfonated melamine-formaldehyde condensates or polycarboxylate ethers, accelerators, corrosion inhibitors, retardants, shrinkage reducers, defoamers or pore-forming agents.

In an additional aspect the invention relates to a hydraulically setting composition containing at least one polymer P, as was described as polymer P in the preceding.

The polymer P can be used as a dispersant or as a component of a dispersant. Such a dispersant contains at least one polymer P. The dispersant can contain additional components. Examples of additional components are additives, such as plasticizers, for example, lignosulfonates, sulfonated naphthalene-formaldehyde condensates, sulfonated melamine-formaldehyde condensates or polycarboxylate ethers (PCE), accelerators, retardants, shrinkage reducers, defoamers, air pore-forming agents or foam-forming agents. Typically the fraction of the polymer P amounts to 5 to 100 wt %, especially 10 to 100 wt %, based on the total weight of the dispersant.

The polymer P can particularly be used to improve the processability of the hydraulically setting compositions produced in this way.

An additional aspect of the invention therefore relates to the use of at least one polymer P, as described in the preceding, to improve the processability of hydraulically setting compositions.

In the use in accordance with the invention the hydraulically setting compositions show improved processability over a longer time period, typically a period of 180 minutes or 240 minutes after addition of water to the hydraulically setting composition. This means that the composition remains workable after a comparatively long time following addition of water and dispersant containing the polymer P compared with compositions that do not contain the polymer P or compared to compositions that contain other water-reducing additives such as conventional plasticizers. For example the comparison takes place in that the composition without polymer P or with conventional plasticizers initially has the same water/cement value (w/z-value) at comparable initial slump values, which are adjusted via the rate of addition of the comparison plasticizer. The slump of hydraulically setting compositions that contain the polymer P preferably decreases essentially slightly or not at all after a certain time, for example after 180 or 240 minutes, so that the change between the initial slump and the slump after 180 minutes or even preferably after 240 minutes is as small as possible.

In the case of use according to the invention, the long-term processability is particularly improved. The long-term processability can be determined via the slump according to EN 1015-3. Preferably the processability is improved at the time point of more than 180 minutes and/or more than 240 minutes, in each case after addition of water. Preferably the processability is also improved at the time point after 180 minutes and/or 240 minutes, in each case after addition of water.

In the use according to the invention of polymers P, which as the radical $R^8M$ especially contain $H^+$, $Na^+$, $Ca^{++}/2$, $Mg^{++}/2$, $NH_4^+$ or an organic ammonium, the processability is especially improved immediately after addition of the water, typically 0-5 min after addition of the water, as measurable for example through the slump according to EN 1015-3.

The use of polymers P according to the invention which contain as the radical $R^8$ an alkyl group with 1 to 6 C atoms, a hydroxyalkyl group with 1 to 6 C atoms or $$----[AO]_s\!\!-\!\!CH_3,$$

especially a hydroxyalkyl group with 1 to 6 C atoms, are advantageous in that the slump of the hydraulically setting composition, especially a cement-containing hydraulically setting composition, measured according to EN 1015-3, over a period of 180 minutes, or 240 minutes (after addition of the water) by In a preferred embodiment of the invention the slump of the hydraulically setting composition, especially a cement-containing hydraulically setting composition, measured according to EN 1015-3, over the period of 180 minutes (after addition of the water) decreases by less than 10%, preferably by less than 5%, particularly preferably not at all.

In a further preferred embodiment of the invention the slump of the hydraulically setting composition, especially a cement-containing hydraulically setting composition, measured according to EN 1015-3, over a period of 240 minutes (after addition of water) decreases by less than 20%, preferably less than 10%, particularly preferably not at all.

The subject matter of the invention is also a method for producing a hydraulically setting composition with extended processability, wherein a hydraulically setting binder, water and a polymer P are mixed. The polymer P comprises polymers P as described in the preceding.

The polymer P is preferably used in a quantity of 0.01 to 5 wt %, especially 0.05 to 2 wt % or 0.1 to 1 wt %, based on the weight of the hydraulically setting binder. The polymer P can be added separately or as a dispersant premixed in solid or liquid form. The dispersant is preferably used in liquid form, especially as an aqueous solution.

The polymer P or the dispersant can also be used in a solid aggregation state, for example as powder, flakes, pellets, granulates or leaflets. Such solid additives can be easily transported and stored. The polymer P in the solid aggregation state can be a component of the so-called dry mixture, for example a cement composition, which can be stored over long time periods and typically is stored packed in sacks or in silos and then used. Such a dry mixture is usable even after a long storage time and has good flow properties.

The polymer P can be added to a hydraulically setting composition with or shortly before or shortly after the addition of water. Particularly suitable here was found to be the addition of the polymer P in the form of an aqueous solution or dispersion, especially as make-up water or as part of the make-up water. The preparation of the aqueous solution or dispersion takes place, for example, by addition of water during the manufacturing of the polymer P or by subsequently mixing with water. Depending on the type of polymer P, a dispersion or solution forms, wherein a uniform solution is preferred.

EXAMPLES

1. Preparation of Polymers by Starting from A, B and C

Examples According to the Invention P-2, P-3 and P-5

For example, the polymer according to the invention P-5 was produced in that in a reaction vessel with an agitator were placed 165 g water, 40 g maleic anhydride (0.4 mol), 330 g allyl-polyethylene glycol (Polyglycol A 1100, Clariant) with a mean molecular weight of 1100 g/mol (0.3 mol), 14.4 g acrylic acid (0.2 mol), 1 g of a 10% aqueous solution of Fe (II)-$SO_4$·$7H_2O$ and 2 g sodium hypophosphite-regulator.

Then 50 g of an 8.5% hydrogen peroxide solution and 50 g of a 10% aqueous Rongalit solution were dropped in at a temperature of 20° C. to 35° C. and a pH of 2-4 over a period of 180 min under agitation.

After the end of dropping-in, a clear, viscous polymer solution was obtained. The polymers P-2 and P-3 were produced in the same way as polymer P-5, corresponding to the information given in Table 1.

2. Preparation of Polymers Starting from A, B and with Constant Addition of C Examples According to the Invention P-1, P-4 and P-6

For example the polymer P-4 according to the invention was produced in that 14.7 g maleic anhydride (0.15 mol), 300 g allyl polyethylene glycol (Polyglycol A 3000, Clariant) with a mean molecular weight of 3000 g/mol (0.10 mol), 110 allyl polyethylene glycol (Polyglycol A 1110, Clariant) with a mean molecular weight of 1100 g/mol (0.1 mol), 2.5 g sodium hypophosphite and 1 g of a 10% aqueous solution of Fe (II)-SO4 7H2O and 300 g of water were placed in a reaction vessel with agitator for 150 minutes under agitation.

Then a solution of 23 g hydroxyethyl acrylate (0.2 mol), 7.2 g acrylic acid (0.1 mol) and 50 g of water, and simultaneously over a period of 180 minutes under agitation, 50 g of 8.5% hydrogen peroxide solution and 50 g of 10% aqueous Rongalit solution were dropped in at a temperature of 20° C. to 35° C. and a pH of 2-3 over 150 minutes.

After the end of dropping in, a clear viscous polymer solution was obtained.

The polymers P-1 and P-6 were produced in the same way as P-4 according to the information given in Table 1.

The polymers P-1-P-7 according to the invention had a mean molecular weight $M_n$ of 30,000-40,000 g/mol.

3. Preparation of Comparison Example V-1

In a reaction vessel with an agitator, 320 g water, 76.6 g maleic acid (0.66 mol) and 330 g of an allyl-polyethylene glycol (Polyglycol A 1100, Clariant) with a mean molecular weight of 1100 g/mol (0.3 mol) were placed.

Then at a temperature of 75° C. to 80° C. and a pH of 2-4 over 4 hours under agitation, 19 g of ammonium persulfate dissolved in 100 g of water were dropped in.

240 min after the beginning of dropping-in, a clear, viscous polymer solution was obtained, which was then partially neutralized with 50% sodium hydroxide.

4. Preparation of Comparison Example V-2

In a reaction vessel with an agitator, 165 g of water, 40 g maleic anhydride (0.4 mol), 330 g allyl-polyethylene glycol with a mean molecular weight of 1100 g/mol (0.3 mol), 2 g sodium hypophosphite and 14.4 g acrylic acid (0.2 mol) were placed.

Then at a temperature of 80° C. to 85° C. and a pH of 2-4 over 180 minutes under agitation, 96 g of a 6.3% sodium peroxodisulfate solution were added.

After the end of the dropping-in process, a clear, viscous polymer solution was obtained.

5. Preparation of Comparison Example V-3

In a reaction vessel with an agitator, 165 g of water, 40 g maleic anhydride (0.4 mol), 330 g vinyl-polyethylene glycol (Polyglycol R 1100, Clariant) with a mean molecular weight of 1100 g/mol (0.3 mol), 14.4 g acrylic acid (0.2 mol), 1 g of a 10% aqueous solution of Fe (II)-SO4 7H2O and 2 g sodium hypophosphite regulator were placed.

Then at a temperature of 20° C. to 35° C. and a pH of 2-4 over a period of 180 min under agitation, 50 g of an 8.5% hydrogen peroxide solution and 50 g of 10% aqueous Rongalit solution were dropped in.

6. Preparation of Comparison Example V-4

In a reaction vessel with an agitator, 200 g of water, 5 g maleic anhydride (0.05 mol), 330 g allyl-polyethylene glycol (Polyglycol A 1100, Clariant) with a mean molecular weight of 1100 g/mol (0.3 mol), 2.5 g sodium hypophosphite and 1 g of a 10% aqueous solution of Fe (II)-SO4 7H2O were initially placed.

Then at a temperature of 20° C. to 35° C. and a pH of 2-4 over 150 minutes under agitation a solution of 23 g hydroxyethyl acrylate (0.2 mol), 16 g acrylic acid (0.22 mol) and 50 g water, and at the same time over a period of 180 minutes under agitation, 50 g of an 8.5% hydrogen peroxide solution and 50 g of a 10% aqueous Rongalit solution were dropped in. At 60 min after the beginning of dropping in, a clear, viscous polymer solution was obtained.

TABLE 1

Polymers P-1 to P-6 according to the invention and comparison polymers V-1 to V-4 contain the structural units A of Formula (I), P-1 to P-6 and comparison polymers V-1, V-2 and V-4 contain the structural units B of Formula (II) and P-1 to P-6 and V-2 to V-4 additionally contain the structural units C of Formula (III), with $R^1$ = COOM, $R^2$ = COOM, $R^3$ = H, $R^4$ = —($CH_2$—$CH_2O$)$_q$—$CH_3$, $R^7$ = H, $R^8$ = H in the case of o1 or $R^8$ = —$CH_2$—$CH_2$—OH in the case of o2, M = $H^+$, $Na^+$; mol-% means mol-% of the individual structural units m, n, o based on the total molar quantity of the structural units of A, B and C in the final polymer.

| Polymer | Mol-% in final polymer (in %) | Temperature (° C.) |
|---|---|---|
| P-1 | m = 12.5<br>n = 37.5 (q = 24)<br>o1 = 50<br>o2 = — | 20-35 |
| P-2 | m = 50<br>n = 37.5 (q = 24)<br>o1 = 12.5<br>o2 = — | 20-35 |
| P-3 | m = 37.8<br>n = 36.6 (q = 24)<br>o1 = 25.6<br>o2 = — | 20-35 |
| P-4 | m = 23<br>n = 31 (q = 24 und q = 66)<br>o1 = 31<br>o2 = 15 | 20-35 |
| P-5 | m = 44.5<br>n = 33.3 (q = 24)<br>o1 = 22.2<br>o2 = — | 20-35 |
| P-6 | m = 44.5<br>n = 33.3 (q = 24)<br>o1 = 22.2<br>o2 = — | 20-35 |
| V-1 | m = 50<br>n = 50 (q = 24)<br>o1 = —<br>o2 = — | 20-35 |
| V-2 | m = 44.5<br>n = 33.3 (q = 24)<br>o1 = 22.2<br>o2 = — | 80-85 |
| V-3 | m = 44.5<br>n = —<br>(Vinyl-polyethylene glycol was used in place of n)<br>o1 = 22.2<br>o2 = — | 20-35 |

TABLE 1-continued

Polymers P-1 to P-6 according to the invention and comparison polymers V-1 to V-4 contain the structural units A of Formula (I), P-1 to P-6 and comparison polymers V-1, V-2 and V-4 contain the structural units B of Formula (II) and P-1 to P-6 and V-2 to V-4 additionally contain the structural units C of Formula (III), with $R^1$ = COOM, $R^2$ = COOM, $R^3$ = H, $R^4$ = —$(CH_2$—$CH_2O)_q$—$CH_3$, $R^7$ = H, $R^8$ = H in the case of o1 or $R^8$ = —$CH_2$—$CH_2$—OH in the case of o2, M = H$^+$, Na$^+$; mol-% means mol-% of the individual structural units m, n, o based on the total molar quantity of the structural units of A, B and C in the final polymer.

| Polymer | Mol-% in final polymer (in %) | Temperature (° C.) |
|---|---|---|
| V-4 | m = 6.5<br>n = 39 (q = 24)<br>o1 = 28.5<br>o2 = 26 | 20-35 |

2. Cement Experiments

The effectiveness of the polymers according to the invention was tested in cement.

To 200 g cement (Schweizer CEM I 42.5) within 30 seconds were added 61 g of make-up water in which 1.33 g of a 30% aqueous solution of a polymer P-1-P-6 according to the invention or a comparison polymer V-1, V-2, V-3 or V-4 was dissolved, and mixed in a tumbler for 2 minutes. The total wet mixing time was 2 minutes. The water/cement value (w/z value) was 0.3.

The slump values of the cement compositions produced in this way, ZZ-P-1-ZZ-P-6, ZZ-V-1, ZZ-V-2, ZZ-V-3 and ZZ-V-4 were measured by filling a cylinder (50 mm high, 50 mm diameter) with the cement composition and carefully lifting the cylinder after 10 seconds. The diameter of the resulting cement composition cake was measured with a sliding caliper and reported as the slump.

This measurement was repeated after 180 min and 240 min. In each case the cement composition was initially mixed for 15 seconds.

TABLE 2

Slump values, n.d. = not determined

| No. | Additive | Slump (mm) after | | |
|---|---|---|---|---|
| | | 2 min | 180 min | 240 min |
| ZZ-P-1 | P-1 | 156 | 150 | 145 |
| ZZ-P-2 | P-2 | 182 | 185 | 185 |
| ZZ-P-3 | P-3 | 165 | 180 | 174 |
| ZZ-P-4 | P-4 | 70 | 147 | 147 |
| ZZ-P-5 | P-5 | 202 | 190 | 190 |
| ZZ-P-6 | P-6 | 186 | 190 | 192 |
| ZZ-V-1 | V-1 | 114 | 146 | 140 |
| ZZ-V-2 | V-2 | 202 | 160 | 140 |
| ZZ-V-3 | V-3 | 50 | 50 | 50 |
| ZZ-V-4 | V-4 | 50 | n.d. | n.d. |

The results in Table 2 show that the polymers according to the invention have excellent plasticizing properties compared with the conventional polymers V-1 and V-3 as well as polymers produced at a temperature of 80° C. to 85° C. (V-2) or polymers containing an excessive amount of the structural unit C of the Formula (III) (V-4).

These show among other things the slump values at 180 min and 240 min after addition of the water to the cement compositions containing the corresponding polymer. Particularly good results for the plasticization shortly (2 min) after addition of the water are achieved in cement compositions when the polymer contains H$^+$ and/or Na$^+$ as the radical $R^8$. It is also apparent that the plasticization effect remains stable for a long period of time. When the polymer contains as the radical $R^8$ a hydroxyalkyl group with 1 to 6 C atoms, this leads to an increased plasticization effect over time (P-4).

The invention claimed is:

1. A polymer P comprising:
  a. m mol-% of at least one structural unit A of formula (I);

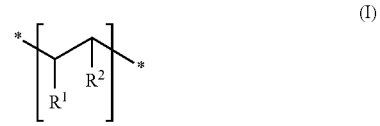

b. n mol-% of at least one structural unit B of formula (II);

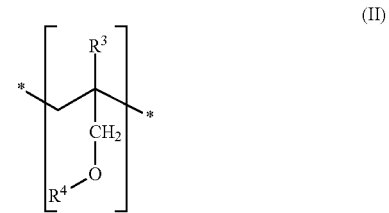

c. o mol-% of at least one structural unit C of formula (III);

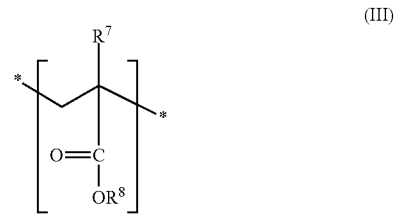

and optionally
  d. p mol-% of at least one additional structural unit D;
  wherein $R^1$ and $R^2$ each independently represent COO$^-$M or COOR$^4$,
  $R^3$ represents H or CH$_3$,
  $R^4$ represents

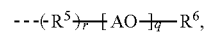

$R^5$ represents an alkylene group with 1 to 6 C atoms,
  $R^6$ represents H, an alkyl group, or an alkylaryl group,
  $R^7$ represents H or CH$_3$,
  $R^8$ represents M, an alkyl group with 1 to 6 C atoms, a hydroxyalkyl group with 1 to 6 C atoms or

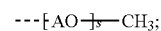

wherein the substituents A independently represent a C2- to C4-alkylene group, the subscript q represents a value of 2 to 300, the subscript r represents a value of 0 to 1 and the subscript s a value of 1 to 5;

wherein M=cation, wherein m, n, o, p each independently represent numbers, wherein the total m+n+o+p=100, and m>0, n>0, o>0 and p≥0; and
wherein:
m=10-80,
n=10-50,
o=10-50 and
p=0-20.

2. The polymer P according to claim 1, wherein the polymer P has a mean molecular weight Mn of 15,000-50,000 g/mol.

3. The polymer P according to claim 1, wherein in the polymer P, m=40-50, n=30-40, o=17.5-30, and p=0-5.

4. The polymer P according to claim 1, wherein R$^8$ represents M.

5. The polymer P according to claim 1, wherein R$^8$ represents an alkyl group with 1 to 6 C atoms, a hydroxyalkyl group with 1 to 6 C atoms or represents

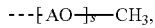

6. A method for producing a polymer P according to claim 1, comprising the step of free radical polymerization of:
i) m' mol-% of at least one compound A', which is a maleic acid anhydride or a compound of formula (IV);

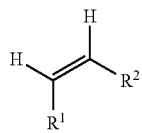

ii) n' mol-% of at least one compound B' of formula (V);

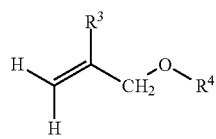

iii) o' mol-% of at least one compound C' of formula (VI);

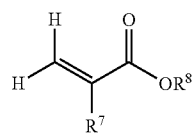

and optionally
iv) p' mol-% of at least one additional compound D';
wherein R$^1$ and R$^2$ each independently represents COO$^-$M or COOR$^4$,
wherein R$^3$ represents H or CH$_3$,
wherein R$^4$ represents

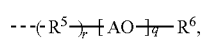

R$^5$ represents an alkylene group with 1 to 6 C atoms,
R$^6$ represents H, an alkyl group, an alkylaryl group, R$^7$ represents H or CH$_3$, R$^8$ represents M, an alkyl group with 1 to 6 C atoms, a hydroxyalkyl group with 1 to 6 C atoms, or

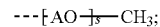

wherein the substituents A each independently represent a C2- to C4-alkylene group, the subscript q represents a value of 2 to 300, the subscript r represents a value of 0 to 1 and the subscript s represents a value of 1 to 5;
wherein M=cation, wherein m', n', o', p' each independently represent numbers,
wherein the total m'+n'+o'+p'=100 and m'>0, n'>0, o'>0 and p'≥0; and
wherein:
m'=10-80,
n'=10-50,
o'=10-50, and
p'=0-20;
in the presence of an initiator for free radical polymerization at a reaction temperature of 10° C. to 50° C.

7. The method according to claim 6, wherein the free radical polymerization initiator is a redox system-based initiator.

8. The method according to claim 7, wherein the redox system-based initiator is a reducing agent and comprises a free radical forming agent, wherein the reducing agent is selected from the group consisting of sodium hydroxymethane sulfinate, alkali metal sulfites, metabisulfites, ascorbic acids and keto-enols and the free radical forming agent is a peroxide compound.

9. The method according to claim 6, wherein the fraction of m'=40-50 mol-%, n'=30-40 mol-%, and o'=17.5-30 mol-%.

10. The method according to claim 6, wherein the free radical polymerization is conducted at a pH of 2-4.

11. Hydraulically setting composition containing at least one polymer P according to claim 1.

12. Method for producing a hydraulically setting composition with extended processability, wherein a hydraulic setting agent, water and a polymer P according to claim 1 are mixed.

13. The polymer P according to claim 1, wherein R$^6$ represents an alkyl group having 1 to 20 C atoms, or an alkylaryl group having 7 to 20 C atoms.

14. The polymer P according to claim 1, wherein in the polymer P, o=20-25.

15. The polymer P according to claim 1, wherein in the polymer P, p=0-5.

16. The polymer P according to claim 1, wherein in the polymer P, p=0.

17. The polymer P according to claim 5, wherein R$^8$ represents a hydroxyalkyl group with 1 to 6 C atoms.

18. The method according to claim 6, wherein the subscript q represents a value of 2 to 50.

19. The method according to claim 6, wherein the reaction temperature is from 15° C. to 35° C.

20. The polymer P according to claim 1, wherein the polymer P comprises greater than 95 wt % of structural units A, B and C.

21. The polymer P according to claim 1, wherein the polymer P comprises greater than 98 wt % of structural units A, B and C.

* * * * *